United States Patent
Ren

(10) Patent No.: US 9,198,130 B2
(45) Date of Patent: Nov. 24, 2015

(54) NODE IN A WIRELESS SENSOR NETWORK AND METHOD FOR ACTIVATING THE NODE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Kai-Sheng Ren, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 210 days.

(21) Appl. No.: 13/869,899

(22) Filed: Apr. 24, 2013

(65) Prior Publication Data

US 2014/0146724 A1 May 29, 2014

(30) Foreign Application Priority Data

Nov. 28, 2012 (CN) .......................... 2012 1 0493034

(51) Int. Cl.
   *H04W 52/02* (2009.01)
(52) U.S. Cl.
   CPC ............ *H04W 52/0225* (2013.01); *Y02B 60/50* (2013.01)

(58) Field of Classification Search
   None
   See application file for complete search history.

(56) References Cited

U.S. PATENT DOCUMENTS

| 8,098,615 | B2 | 1/2012 | Rhee | |
| 8,391,435 | B2 * | 3/2013 | Farley et al. | 375/358 |
| 8,522,061 | B2 * | 8/2013 | Hebron et al. | 713/323 |
| 2010/0097969 | A1 | 4/2010 | De Kimpe et al. | |
| 2010/0150042 | A1 * | 6/2010 | Oh et al. | 370/311 |
| 2011/0188434 | A1 * | 8/2011 | Rhee | 370/311 |
| 2011/0255445 | A1 * | 10/2011 | Johnson et al. | 370/255 |
| 2012/0263053 | A1 | 10/2012 | Li et al. | |

FOREIGN PATENT DOCUMENTS

CN    101242433 B    5/2011

\* cited by examiner

*Primary Examiner* — Donald Mills
(74) *Attorney, Agent, or Firm* — Novak Druce Connolly Bove + Quigg LLP

(57) ABSTRACT

A method for activating a node in a Wireless Sensor Network includes detecting and amplifying pulse signals from a base station; determining whether pulses in the amplified pulse signal are valid; and counting valid pulses in three time periods. A target identifier is calculated using a predetermined formula and numbers of the valid pulses counted. Whether the target identifier matches an identifier of the communication system is determined. The communication system when the target identifier matches the identifier of the communication system is activated. The node is also provided.

8 Claims, 2 Drawing Sheets

NODE IN A WIRELESS SENSOR NETWORK AND METHOD FOR ACTIVATING THE NODE

BACKGROUND

1. Technical Field

The present disclosure relates to nodes in Wireless Sensor Networks (WSNs) and methods for activating the nodes in the WSNs, and particularly to a node and method for activating the node in a WSN using pulse signals from a base station.

2. Description of Related Art

Wireless Sensor Networks (WSNs) include nodes that are spatially distributed to collect data from the environment and to deliver them to a final user. A node typically sends and receives a packet of hundreds of bits in a period ranging from seconds to some minutes. Consequently, for nodes that do not reduce power consumption during idles states, the biggest fraction of the energy in each node is spent in idle listening to the channel (e.g., waiting for packets).

Therefore, it is desirable to provide a node in a WSN and method for activating the node using pulse signals from a base station.

DETAILED DESCRIPTION

Embodiments of the disclosure will be described with reference to the accompanying drawings.

Figure 1:
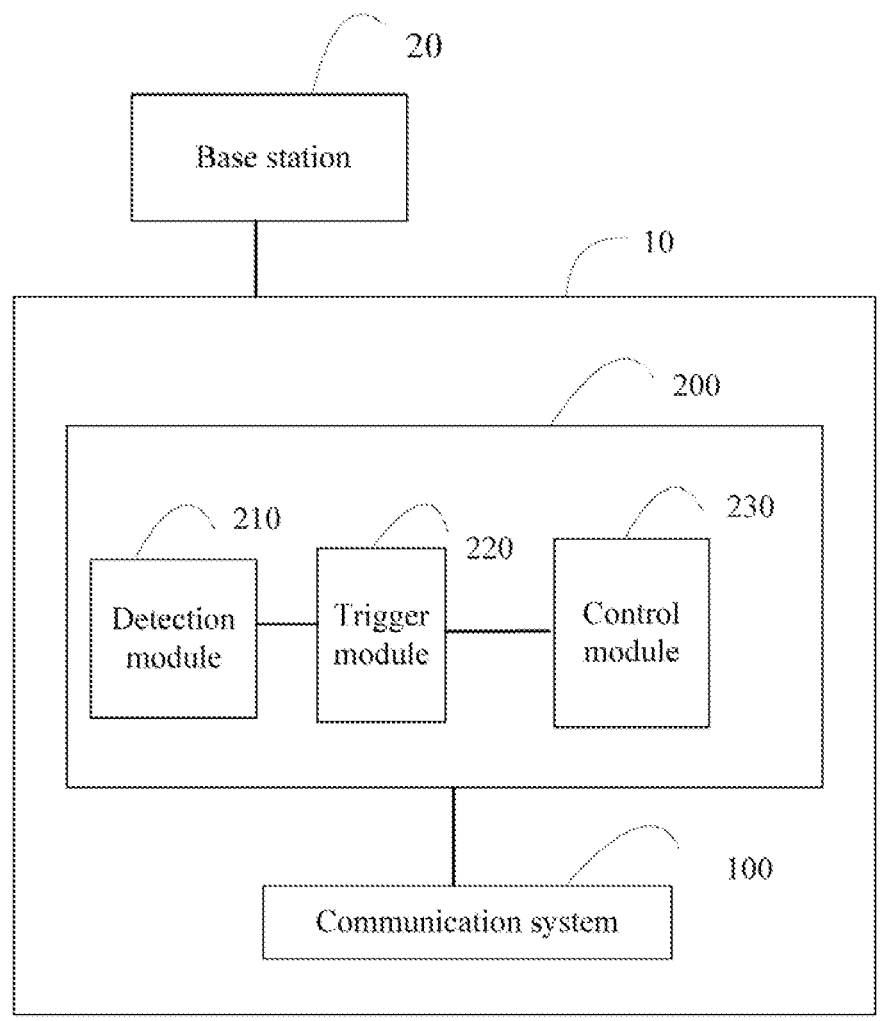
FIG. 1 is a functional block diagram of a node for communicating with a base station, according to an embodiment.

FIG. 1 is an embodiment of a node 10 a Wireless Sensor Network (WSN). The node 10 is configured for communicating with a base station 20. The node 10 and the base station 20 may be a communication device. The base station 20 sends pulse signals to a plurality of nodes 10 in the WSNs using a communication protocol.

The node 10 includes a communication system 100 and an activating system 200. The node 10 has an identifier. The communication system 100 has a normal mode and an idle mode. In the normal mode, the communication system 100 can communicate with the base station 20, for example, exchanging data with the base station 20. In the idle mode, the communication system 100 is inactivated and does not consume power or consumes less power than that consumed in the normal mode. The activating system 200 keeps detecting pulse signals from the base station 20 and is configured for activating the communication system 100, i.e., switching the communication system 100 from the idle mode to the normal mode, based upon the pulse signals. Power consumption of the communication system 100 in the normal mode is much greater than power consumption of the activating system 200.

The activating system 200 includes a detection module 201, a trigger module 202, and a control module 203.

Figure 2:
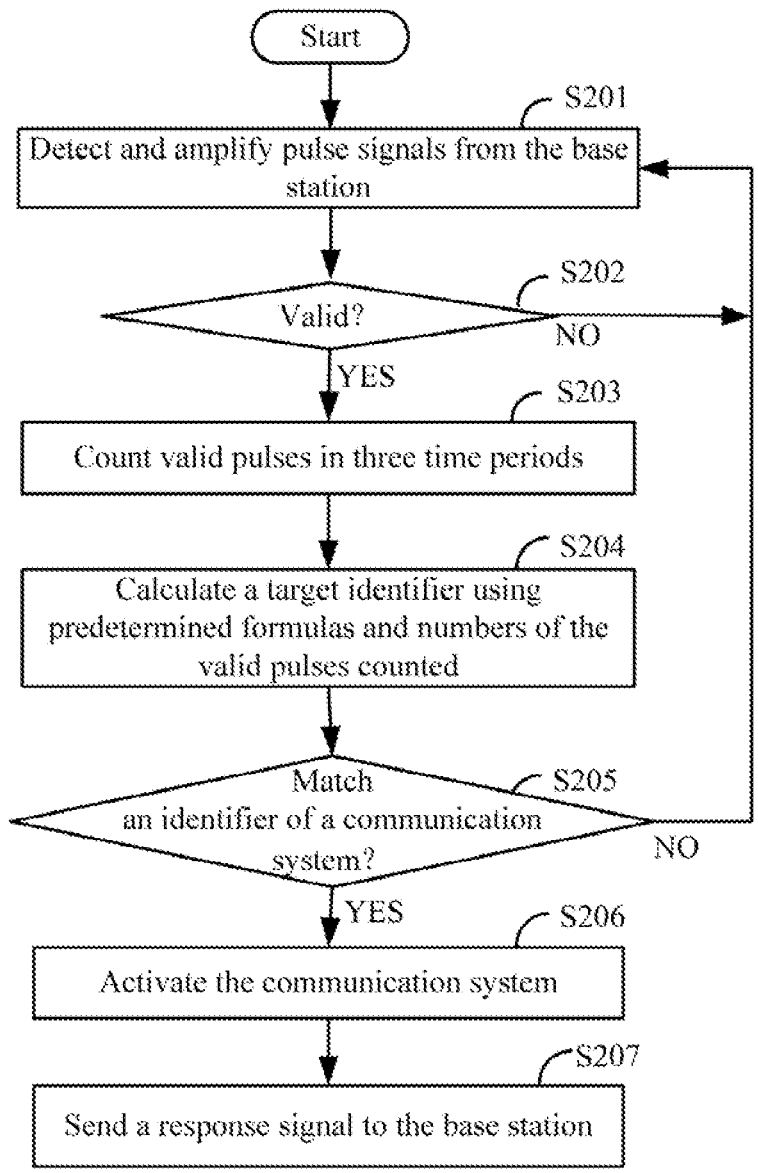
FIG. 2 is a flowchart showing a method for activating the node of FIG. 1.

Referring to FIG. 2, a method for activating, e.g., a communication system 100 can be implemented by the following steps S201 through S207.

In step S201, the detection module 201 detects and amplifies the pulse signals from the base station. The method of how to detect and amplify the pulse signals from the base station can be referenced by US Patent Applicant Publication US20100216523A1.

In step S202, the trigger module 202 determines whether pulses in the pulse signal are valid, that is, whether the pulses complies with a predetermined rule, such as, whether amplitudes of the pulses is larger than a predetermined value. If yes, the procedure goes step S203. If no, the procedure jumps back to repeat step S201. US Patent Applicant Publication US20100216523A1 is incorporated herewith for reference for how to determine whether or not the pulses are valid.

In step S203, the control module 203 counts valid pulses in three time periods.

In step S204, the control module 203 calculates a target identifier using predetermined formulas and the number of the valid pulses counted in step S203. In detail, the predetermined formulas is corresponding to the communication protocol, the target identifier can be calculated using the formula: $(A+B)*n=C$, wherein A is the number of the valid pulses in a first time period of the three time periods, B is the number of the valid pulses in a second time period of the three time periods, C is the number of the valid pulses in a third time period of the three time periods, and n is the target identifier.

In step S205, the control module 203 determines whether the target identifier matches the identifier of the node 10. If yes, the procedure goes to step S206. If no, the procedure jumps back to repeat step S201.

In step S206, the control module 203 activates the communication system 100 and thus the communication system 100 is switched from the idle mode into the normal mode, and then switched from the normal mode into the idle mode automatically after communicating with the base station 20.

In step S207, the control module 203 sends a response signal to the base station 20. The base station 200 re-emits the pulse signals if no response signal is received in a predetermined time.

Particular embodiments are shown here and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A node which comprises an identifier in a Wireless Sensor Network for communicating with a base station, which sends pulse signals according to a communication protocol, the node comprising:

a communication system having a normal mode and an idle mode, wherein in the normal mode, the communication communicates with the base station; and in the idle mode, the communication system is inactivated and does not consume power or consumes less power; and an activating system comprising:

a detection module, to detect and amplify pulse signals from the base station;

a trigger module, to determine whether pulses in amplified pulse signals are valid; wherein the pulses in the pulses signal are valid when the pulses complies with a predetermined rule; and a control module, to count valid pulses in three time periods, calculate a target identifier using a predetermined formula corresponding to the communication protocol and numbers of the valid pulses counted, determine whether the target identifier matches the identifier of the node, activate the communication system and thus switch the communication system from the idle mode into the normal mode when the target identifier matches the identifier of the node, and switch the communication system from the normal mode into the idle mode automatically after communicating with the base station.

2. The node according to claim 1, wherein the target identifier is calculated using the formula: $(A+B)*n=C$, wherein A is the number of the valid pulses counted in a first time period of the three time periods, B is the number of the valid pulses counted in a second time period of the three time periods, C is the number of the valid pulses counted in a third time period of the three time periods, and n is the target identifier.

3. The node according to claim 1, wherein the control module further sends a response signal to the base station, the base station re-emits the pulse signals if no response signal is received in a predetermined time.

4. A method for activating a node which comprises an identifier in a Wireless Sensor Network which is communicated with a base station, the method comprising:
   detecting and amplifying pulse signals from the base station;
   determining whether pulses in amplified pulse signals are valid; wherein the pulses in the pulses signal are valid when the pulses complies with a predetermined rule;
   counting valid pulses in three time periods;
   calculating a target identifier using a predetermined formula corresponding to a communication protocol which is used to send the pulse signals by the base station and numbers of the valid pulses counted, wherein the pulse signals are sent by the base station at a predetermined rule corresponding to the predetermined formula;
   determining whether the target identifier is matches an identifier of the node; and
   activating the communication system when the target identifier matches to the identifier of the node.

5. The method according to claim 4, wherein the node comprise a communication system having a normal mode and an idle mode, in the normal mode, the communication communicates with the base station, and in the idle mode, the communication system is inactivated and does not consume power or consumes less power, the method of activating the communication system when the target identifier matches the identifier of the node means the communication system switches from the idle mode into the normal mode.

6. The method according to claim 5, wherein the communication system switches from the normal mode into the idle mode automatically after communicating with the base station.

7. The method according to claim 4, wherein the target identifier is calculated using the formula: $(A+B)*n=C$, wherein A is the number of the valid pulses counted in a first time period of the three time periods, B is the number of the valid pulses counted in a second time period of the three time periods, C is the number of the valid pulses in a third time period of the three time periods, and n is the target identifier.

8. The method according to claim 4, further comprising sending a response signal to the base station.

* * * * *